United States Patent Office 2,951,088
Patented Aug. 30, 1960

2,951,088
DIAMINO-N,N,N',N'-TETRAKIS-PHOSPHORIC ACID DERIVATIVES

Arno Debo, Heidelberg, Germany, assignor to Firma Joh. A. Benckiser G.m.b.H. Chemische Fabrik, Ludwigshafen (Rhine), Germany No Drawing. Filed Aug. 4, 1958, Ser. No. 753,083
Claims priority, application Germany Aug. 31, 1957

18 Claims. (Cl. 260—461)

The present invention relates to diamino-N,N,N',N'-tetrakis-phosphoric acid derivatives and to methods of producing the same, and more particularly to phosphoric acid ester derivatives.

It is an object of the present invention to provide for the production of new compounds which are diamino-N,N,N',N'-tetrakis-phosphoric acid derivatives.

It is another object of the present invention to provide for the production of new compounds which are useful as sequestering agents, as additives to oils, and for other purposes.

It is still a further object of the present invention to provide for the production of new compounds of the invention.

Other objects and advantages of the present invention will be apparent from a further reading of the specification and of the appended claims.

With the above objects in view, the present invention mainly comprises a compound having the following general formula:

(I) 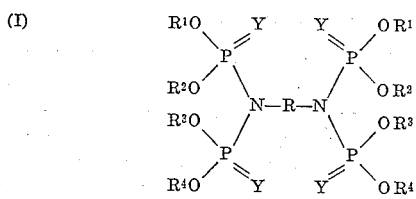

wherein $R^1$, $R^2$, $R^3$ and $R^4$ are each selected from the group consisting of alkyl and aryl radicals, wherein Y is selected from the group consisting of oxygen and sulfur, and wherein R is a divalent hydrocarbon radical of at least two carbon atoms.

Preferably, the alkyl radicals for the substituents $R^1$, $R^2$, $R^3$ and $R^4$ are radicals of up to six carbon atoms such as methyl, ethyl, propyl, isopropyl, butyl, isobutyl, amyl, hexyl, etc. The substituents may of course be the same alkyl radicals or different alkyl radicals.

Among the most suitable aryl radicals for the substituents $R^1$, $R^2$, $R^3$ and $R^4$ are the phenyl, benzyl, tolyl, and cresyl radicals.

The substituent R may be substantially any divalent hydrocarbon radical of at least two carbon atoms, that is either straight chain, homocyclic or heterocyclic divalent radicals of at least two carbon atoms. Among the suitable radicals for the substituent R may be mentioned ethylene, trimethylene, tetramethylene, pentamethylene, hexamethylene, phenylene, diphenylene, diphenylene-methane, naphthylene, and 2,6-pyridine.

Instead of defining the compounds of the present invention by Formula I above, the compounds may be defined by the following Formula II:

(II) 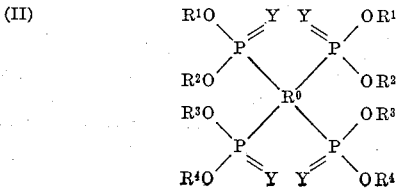

Utilizing the above formula, it is possible to define the radicals by the organic diamine utilized in the production of the compounds. Thus, in Formula II above $R^1$, $R^2$, $R^3$, $R^4$ and Y have the same definition as previously. However, $R^0$ would then be defined as an organic diamine such as ethylenediamine, propylenediamine, butylenediamine, pentamethylenediamine, hexamethylenediamine, p-phenylenediamine, benzidine, 4,4-diamino-diphenylmethane, 1,8-naphthalenediamine, 1,2-diaminopropane, 2,6-diaminopyridine, and the like.

The compounds of the present invention may be utilized as sequestering agents, as hydraulic oils, as complex-formers for the removal of heavy metal traces, from water or organic solvents depending upon whether the particular compound is water-soluble or water-insoluble. Furthermore, the compounds can be utilized as plasticizers.

The compounds of the present invention may be formed by reacting a diamino-N,N'-bis-phosphoric acid derivative of the following general formula:

(III) 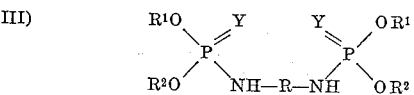

wherein $R^1$, $R^2$, R and Y have the definition as above, with a halogen-phosphoric acid-di-ester having the following general formula:

(IV) 

wherein $R^3$, $R^4$ and Y have the same definition as above, and wherein X is a halogen, in the presence of an alkali metal or an alkali metal hydride, such as sodium, sodium hydride, potassium, potassium hydride, lithium and the like.

The reaction of the present invention proceeds in accordance with the following equation:

(V) 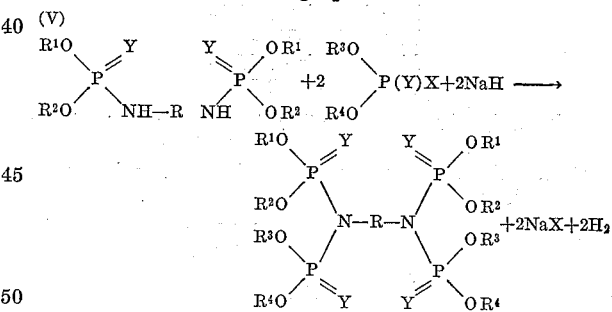

As starting material for the production of the compounds of the present invention it is possible to utilize all N,N'-bis-phosphoric acid-di-esters of the above-mentioned diamines, the ester groups of which may be any of the above-mentioned alkyl or aryl groups. Among the suitable N,N'-bis-phosphoric acid-di-esters as starting material may be mentioned the following:

Ethylenediamine - N,N' - bis-phosphoric acid-di-n-propyl ester

Ethylenediamine - N,N'-bis-phosphoric acid-di-isopropyl ester

Diethylenetriamine-N,N'-bis-phosphoric acid-di-n-propyl ester

Diethylenetriamine - N,N' - bis-phosphoric acid-di-n-butyl ester p-Phenylenediamine-N,N'-bis-phosphoric acid-di-n-propyl ester p-Phenylenediamine - N,N'-bis-phosphoric acid-di-n-butyl ester p - Phenylenediamine - N,N' - bis-phosphoric acid-di-isobutyl ester Benzidine-N,N'-bis-phosphoric acid-di-n-propyl ester
Ethylenediamine - N,N'-bis-thiophosphoric acid-di-n-propyl ester
p - Phenylenediamine - N,N' - bis-thiophosphoric acid-diethyl ester
Propylenediamine - N,N' - bis - phosphoric acid-di-propyl ester
Propylenediamine - N,N' - bis - phosphoric acid-diphenyl ester
Hexamethylenediamine-N,N'-bis-phosphoric acid-di-butyl ester
Dipropylenetriamine-N,N'-bis-phosphoric acid - dibenzyl ester
Hexamethylene - diamine - N,N' - bis-phosphoric acid-diphenylester
1,2 - diaminopropane - N,N'-bis-phosphoric acid-di-n-propylester
4,4' - diamino-diphenylmethane-N,N'-bis-phosphoric acid diphenylester
1,8 - naphthalenediamine - N,N'-bis-phosphoric acid-di-n-butylester
1,8 - naphthalenediamine - N,N' - bis-phosphoric acid-diphenylester
Hexamethylenediamine - N,N' - bis-thio-phosphoric acid-dimethylester All halogen phosphoric acid di-esters falling within Formula IV above may be utilized in the reaction of the present invention. The following is a list of some of the suitable chloro-phosphoric or thio-phosphoric acid-dialkyl esters which may be utilized in accordance with the present invention:

$$ClP(O)(OCH_3)_2$$
$$ClP(O)(OC_2H_5)_2$$
$$ClP(O)(OC_3H_7)_2$$
$$ClP(O)(O\text{-iso-}C_3H_7)_2$$
$$ClP(O)(OC_4H_9)_2$$
$$ClP(O)(O\text{-iso-}C_4H_9)_2$$
$$ClP(O)(O\text{-iso-}C_5H_{11})_2$$
$$ClP(S)(OCH_3)_2$$
$$ClP(S)(OC_2H_5)_2$$
$$ClP(S)(OC_3H_7)_2$$
$$ClP(S)(O\text{-iso-}C_3H_7)_2$$
$$ClP(S)(OC_4H_9)_2$$
$$ClP(S)(O\text{-iso-}C_4H_9)_2$$
$$C\text{-}P(S)(O\text{-iso-}C_5H_{11})_2$$

Naturally the corresponding bromine esters of the above compounds can be used in place of the chlorine esters. Likewise, mixed esters can be used, as for example the following:

$$ClP(O)(OCH_3)OC_2H_5$$
$$ClP(O)(OC_2H_5)OC_3H_7$$
$$ClP(O)(OC_3H_7)OC_4H_9$$
$$ClP(S)(OCH_3)OC_2H_5$$
$$ClP(S)(OC_3H_7)OC_4H_9$$

The following are among the suitable halogen phosphoric acid-diaryl esters that may be utilized as starting material in accordance with the present invention:

$$ClP(S)(CC_6H_5)_2$$
$$ClP(O)(OC_6H_5)_2$$
$$ClP(O)(OCH_2C_6H_5)_2$$
$$ClP(O)(OC_6H_4CH_2)_2$$
$$ClP(O)(OC_6H_3(OH)(CH_3))_2$$

The diamine-N,N'-bis-phosphoric acid derivative and the halogen phosphoric acid diester are most preferably reacted in stoichiometric amounts, that is two mols of the halogen phosphoric acid ester for each mol of the diamino-bis-phosphoric acid diester. Of course, the reaction will take place with whatever amounts of these reactants are utilized, however, if other than stoichiometric amounts are utilized the yield will of course be somewhat lower.

The alkali metal or alkali metal hydride, such as sodium or sodium hydride should also be utilized preferably in a stoichiometric amount, that is one mol of sodium or sodium hydride for each mol of hydrogen atoms linked to the nitrogen atoms which must be replaced. In other words, the sodium or sodium hydride is utilized in an amount of two mols thereof for each mol of the diamino-N,N'-bis-phosphoric acid derivative.

The reaction of the present invention can be carried out without the use of a solvent, or can be carried out in a medium of an organic solvent. Any organic solvent which does not react with sodium or sodium hydride may be utilized as the solvent medium for carrying out the reaction of the present invention. Among the suitable solvents may be mentioned liquid hydrocarbons, ether, benzene, toluene, xylene, petroleum ether, cyclohexane, methylcyclohexane, standard gasoline and the like. Organic solvents such as chlorinated hydrocarbons and alcohols which would react with sodium or sodium hydride should be avoided. The total amount of reactants when utilizing a solvent medium should preferably be present in a concentration between 5–50% by weight, and most preferably in a concentration of about 10–20% by weight.

The reaction temperature may vary within wide limits, and the reaction can conveniently be carried out at temperatures between 0 and 150° C., and most preferably at a temperature between 20 and 90° C. The temperature utilized should preferably be below the boiling point of the solvent if the reaction is carried out in a solvent medium.

The following examples are given to further illustrate the present invention. The scope of the invention is not, however, meant to be limited to the specific details of the examples.

EXAMPLE 1

*Ethylenediamine-N,N,N',N'-tetrakis-phosphoric acid-diisopropyl ester*

$$[(i\text{-}C_3H_7O)_2P(O)]_2N\text{-}CH_2CH_2\text{-}N[P(O)(OC_3H_7\text{-}i)_2]_2$$

6.45 g. of a 50% sodium hydride-oil suspension is added in portions while stirring to a solution of 25 g. of methylenediamine-N,N'-bis-phosphoric acid-di-isopropyl ester and 25.8 g. of chlorophosphoric acid-di-isopropyl ester in 100 cc. of dry xylene. It should be noted that in carrying out the reaction of the present invention in a solvent medium the organic solvent should preferably be waterfree so as to avoid reaction with the sodium or sodium hydride.

The above reaction mixture is stirred until no further gas is evolved. After adding an additional amount of 250 cc. of xylene the liquid is removed by suction filtration from the residue. The xylene is removed from the filtrate by distillation.

There is thus obtained 45 g. of the desired compound in the form of a practically colorless oil which is miscible with most organic solvents. $n_D^{20}=1.4232$. Analysis: calculated—17.33% P; found—17.4% P; molecular weight calculated—716; found 676 (cryoscopic determination in nitrobenzene).

EXAMPLE 2

*p-Phenylenediamine-tetrakis - phosphoric acid-di-n-butyl ester*

$$[(C_4H_9O)P(O)]_2N.C_6H_4N[P(O)(OC_4H_9)_2]_2\text{-}p$$

34.4 g. of phenylenediamine-N,N'-bis-phosphoric acid-di-n-butyl ester are dissolved in 200 cc. of petroleum ether (boiling point 110–140° C.) and 7 g. of a 50% sodium hydride-oil-suspension are added while heating and excluding moisture. The addition is made in small portions. After the end of the vigorous reaction, the reaction mixture is heated to boiling for a short time. The major portion of the solvent is drawn off from the separated thick red mass. The mass is washed two times with petroleum ether and 200 cc. of petroleum ether are subsequently added. 32 g. of monochloro phosphoric acid-n-butyl ester are added dropwise under stirring and the stirring is continued for an additional hour. The reaction mass is filtered to remove the precipitated sodium chloride and the solvent is evaporated under vacuum at a temperature of 100° C.

There is thus obtained 52 g. of a red-brown oil which is the desired compound. The yield corresponds to 85% of the theoretical.

P calculated—14.15%; found 14.1%.
N calculated 3.2%; found 2.9%.
Molecular weight—calculated—876; found 850 (cryoscopic determination in benzene).

EXAMPLE 3

*Hexamethylenediamine-N,N-N',N'-tetrakis-phosphoric acid-di-phenyl ester*

$[(C_6H_5O)_2P(O)]_2N(CH_2)N[P(O)(OC_6H_5)_2]_2$ 58 g. of hexamethylenediamine-N,N'-bis-phosphoric acid-diphenyl ester are dissolved in 500 cc. of dry benzene. In a three-necked flask provided with a stirrer, dropping funnel and cooler 24 g. of a 20% suspension of sodium hydride in xylene are added to the solution. 53.7 g. of chlorophosphoric acid-diphenyl ester are added dropwise under stirring. The reaction mixture is heated for a short time to initiate the reaction. The reaction mixture is then stirred for an additional hour and allowed to stand over night. It is then filtered to remove the precipitated sodium chloride.

The benzene is drawn off under vacuum and the residue is extracted with ether to remove any still remaining starting material. The extraction residue is a colorless mass of waxy consistency and is the above designated compound. The yield of 76 g. corresponds to 72.8% of the theoretical. The melting point is 79–82° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations, should and are intended to be comprehended within the meaning and range of equivalence of the following claims.

What is claimed as new and desired to be secured by Letters Patent is:

1. A compound having the following general formula:

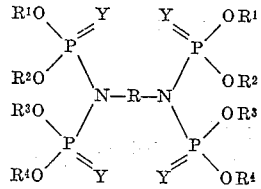

wherein $R^1$, $R^2$, $R^3$ and $R^4$ are each selected from the group consisting of alkyl radicals of up to 6 carbon atoms and the phenyl, benzyl, tolyl and cresyl radicals; wherein Y is selected from the group consisting of oxygen and sulfur; and wherein R is a divalent hydrocarbon radical selected from the group consisting of ethylene, trimethylene, tetramethylene, pentamethylene, hexamethylene, phenylene, diphenylene, diphenylenemethane, naphthylene and 2,6-pyridine radicals.

2. A compound having the following general formula:

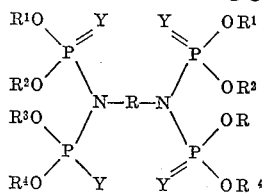

wherein $R^1$, $R^2$, $R^3$, $R^4$ are each alkyl radicals of up to 6 carbon atoms; wherein Y is oxygen; and wherein R is ethylene.

3. A compound having the following general formula:

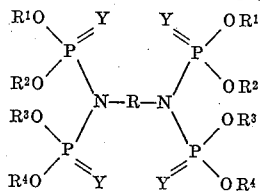

wherein $R^1$, $R^2$, $R^3$, and $R^4$ are each alkyl radicals of up to 6 carbon atoms; wherein Y is oxygen; and wherein R is a polymethylene radical of up to 6 methylene groups.

4. A compound having the following general formula:

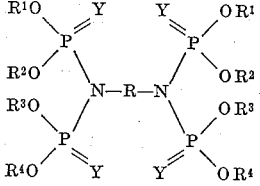

wherein $R^1$, $R^2$, $R^3$ and $R^4$ are each alkyl radicals of up to 6 carbon atoms; wherein Y is oxygen; and wherein R is phenylene.

5. A compound having the following general formula:

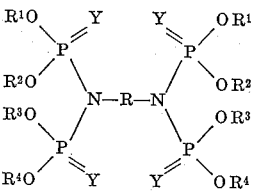

wherein $R^1$, $R^2$, $R^3$ and $R^4$ are each alkyl radicals of up to 6 carbon atoms; wherein Y is oxygen; and wherein R is hexamethylene.

6. A compound having the following general formula:

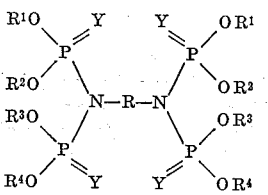

wherein $R^1$, $R^2$, $R^3$ and $R^4$ are each phenyl radicals; wherein Y is oxygen; and wherein R is ethylene.

7. A compound having the following general formula:

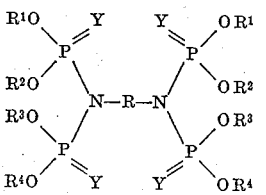

wherein $R^1$, $R^2$, $R^3$ and $R^4$ are each phenyl radicals; wherein Y is oxygen; and wherein R is a polymethylene radical of up to 6 methylene groups.

8. A compound having the following general formula:

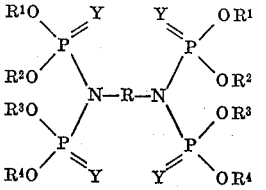

wherein $R^1$, $R^2$, $R^3$ and $R^4$ are each phenyl radicals; wherein Y is oxygen; and wherein R is phenylene.

9. A compound having the following general formula:

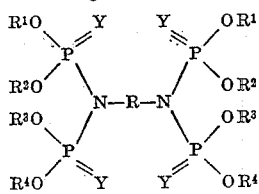

wherein $R^1$, $R^2$, $R^3$ and $R^4$ are each phenyl radicals; wherein Y is oxygen; and wherein R is hexamethylene.

10. A method of producing a compound having the following general formula:

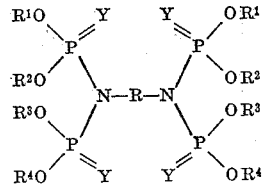

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N′-bis-phosphoric acid derivative of the following general formula:

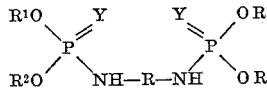

wherein $R^1$, $R^2$, R and Y have the same definitions as above with a halogen-phosphoric acid-di-ester having the following general formula:

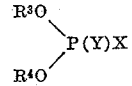

wherein $R^3$, $R^4$ and Y have the same definitions as above and wherein X is a halogen in the presence of a substance selected from the group consisting of alkali metals and alkali metal hydrides; and recovering the thus formed compound.

11. A method of producing a compound having the following general formula:

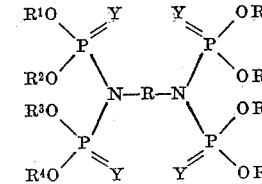

wherein $R^1$, $R^2$, $R^3$, and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N′-bis-phosphoric acid derivative of the following general formula:

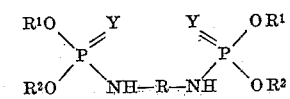

wherein $R^1$, $R^2$, R and Y have the same definitions as above with a halogen-phosphoric acid-di-ester having the following general formula:

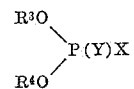

wherein $R^3$, $R^4$ and Y have the same definitions as above and wherein Y is a halogen in the presence of sodium hydride; and recovering the thus formed compound.

12. A method of producing a compound having the following general formula:

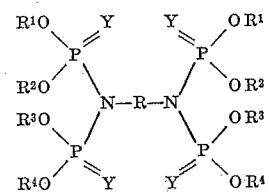

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N′-bis-phosphoric acid derivative of the following general formula:

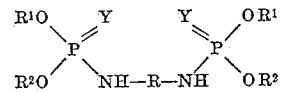

wherein $R^1$, $R^2$, R and Y have the same definitions as above with a halogen-phosphoric acid-diester having the following general formula:

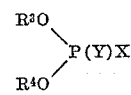

wherein $R^3$, $R^4$ and Y have the same definitions as above and wherein X is a halogen in the presence of sodium; and recovering the thus formed compound.

13. A method of producing a compound having the following general formula:

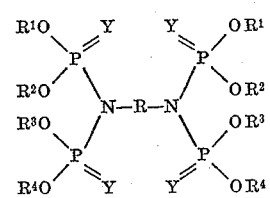

wherein $R^1$, $R^2$, $R^3$ and $R^4$ are each selected from the group consisting of alkyl radicals, of up to 6 carbon atoms and the phenyl, benzyl, tolyl, and cresyl radicals wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N′-bis-phosphoric acid derivative of the following general formula:

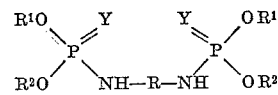

wherein $R^1$, $R^2$, R and Y have the same definitions as above with a halogen-phosphoric acid-di-ester having the following general formula:

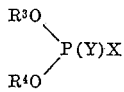

wherein $R^3$, $R^4$ and Y have the same definitions as above and wherein X is a halogen in the presence of a substance selected from the group consisting of alkali metals and alkali metal hydrides in a medium of an inert organic liquid non-reactive with said substance; and recovering the thus formed compound.

14. A method of producing a compound having the following general formula:

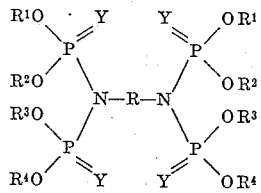

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N'-bis-phosphoric acid derivative of the following general formula:

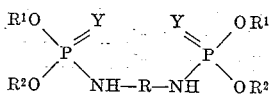

wherein $R^1$, $R^2$, R and Y have the same definitions as above with a halogen-phosphoric acid-di-ester having the following general formula:

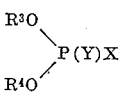

wherein $R^3$, $R^4$ and Y have the same definitions as above and wherein X is a halogen in the presence of a substance selected from the group consisting of alkali metals and alkali metal hydrides in a medium of an inert organic liquid non-reactive with said substance and being selected from the group consisting of aliphatic hydrocarbons, ether, benzene, toluene and xylene; and recovering the thus formed compound.

15. A method of producing a compound having the following general formula:

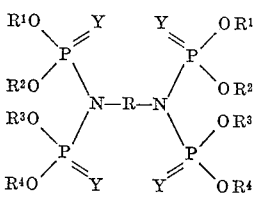

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N'-bis-phosphoric acid derivative of the following general formula:

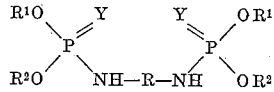

wherein $R^1$, $R^2$, R and Y have the same definitions as above with a halogen-phosphoric acid-di-ester having the following general formula:

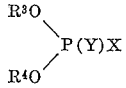

wherein $R^3$, $R^4$ and Y have the same definitions as above and wherein X is a halogen in the presence of a substance selected from the group consisting of alkali metals and alkali metal hydrides in a medium of an inert organic liquid non-reactive with said substance at a temperature between 0 and 150° C.; and recovering the thus formed compound.

16. A method of producing a compound having the following general formula:

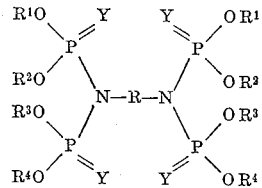

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N'-bis-phosphoric acid derivative of the following general formula:

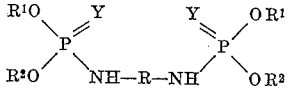

wherein $R^1$, $R^2$, R and Y have the same definitions as above with a halogen-phosphoric acid-di-ester having the following general formula:

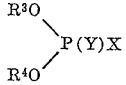

wherein $R^3$, $R^4$ and Y have the same definitions as above and wherein X is a halogen in the presence of a substance selected from the group consisting of alkali metals and alkali metal hydrides in a medium of an inert organic liquid non-reactive with said substance at a temperature between 0 and 150° C., said diamino-N,N'-bis-phosphoric acid derivative, said halogen-phosphoric acid-di-ester and said substance being present in substantially stoichiometric quantities; and recovering the thus formed compound.

17. A process of producing a compound having the following general formula:

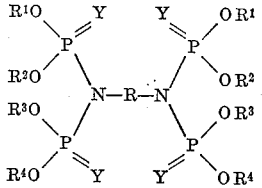

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N'-bis-phosphoric acid derivative of the following general formula:

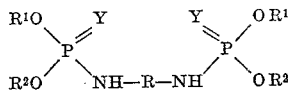

wherein $R^1$, $R^2$, R and Y have the same definitions as above with a halogen-phosphoric acid-di-ester having the following general formula:

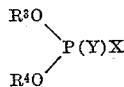

wherein $R^3$, $R^4$ and Y have the same definitions as above and wherein X is a halogen in the presence of a substance selected from the group consisting of alkali metals and alkali metal hydrides in a concentration of 5–50% by weight in a medium of an inert organic liquid non-reactive with said substance at a temperature between 0 and 150° C.; and recovering the thus formed compound.

18. A method of producing a compound having the following general formula:

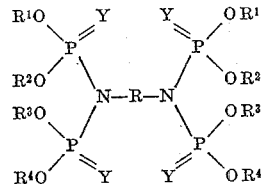

wherein $R^1$, $R^2$, $R^3$ and $R^4$ are each selected from the group consisting of alkyl radicals of up to 6 carbon atoms and the phenyl, benzyl, tolyl, and cresyl radicals, wherein Y is selected from the group consisting of oxygen and sulfur, and wherein R is a divalent radical selected from the group consisting of ethylene, trimethylene, tetramethylene, pentamethylene, hexamethylene, phenylene, diphenylene, diphenylmethane, naphthylene and 2,6-pyridine radicals, comprising the steps of reacting a diamino-N,N'-bis-phosphoric acid derivative of the following general formula:

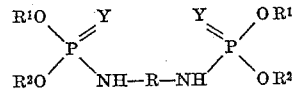

wherein $R^1$, $R^2$, R and Y have the same definitions as above with a halogen-phosphoric acid-di-ester having the following general formula:

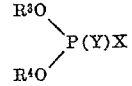

wherein $R^3$, $R^4$ and Y have the same definitions as above and wherein X is a halogen in the presence of a substance selected from the group consisting of alkali metals and alkali metal hydrides in a concentration of 5–50% by weight in a medium of an inert organic liquid non-reactive with said substance at a temperature between 0 and 150° C., said diamino-N,N'-bis-phosphoric acid derivative, said halogen-phosphoric acid-di-ester and said substance being present in substantially stoichiometric quantities; and recovering the thus formed compound.

References Cited in the file of this patent
UNITED STATES PATENTS

| | | |
|---|---|---|
| 2,798,086 | Coover et al. | July 2, 1957 |
| 2,870,190 | Burgert et al. | Jan. 20, 1959 |